(12) United States Patent
Nakai et al.

(10) Patent No.: US 10,676,151 B2
(45) Date of Patent: Jun. 9, 2020

(54) HYDRAULIC OPERATING DEVICE

(71) Applicant: Shimano Inc., Sakai, Osaka (JP)

(72) Inventors: Mototsugu Nakai, Osaka (JP); Kohei Obuchi, Osaka (JP); Natsuki Noma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/667,914

(22) Filed: Aug. 3, 2017

(65) Prior Publication Data

US 2019/0039684 A1 Feb. 7, 2019

(51) Int. Cl.

| | | |
|---|---|---|
| *B62L 3/02* | (2006.01) | |
| *F16D 65/14* | (2006.01) | |
| *F16D 121/02* | (2012.01) | |
| *B62K 23/06* | (2006.01) | |
| *B62L 1/10* | (2006.01) | |
| *F16D 65/18* | (2006.01) | |

(52) U.S. Cl.
CPC .............. *B62L 3/023* (2013.01); *F16D 65/14* (2013.01); *B62K 23/06* (2013.01); *B62L 1/10* (2013.01); *F16D 65/18* (2013.01); *F16D 2121/02* (2013.01)

(58) Field of Classification Search
CPC ........... B62L 3/023; B62L 3/02; B62K 23/06; B62K 19/38; B62M 25/04
USPC ....................................................... 188/344
See application file for complete search history.

(56) References Cited

U.S. PATENT DOCUMENTS

| | | | | |
|---|---|---|---|---|
| 3,802,200 | A * | 4/1974 | Kolm ..................... | B62L 3/023 60/594 |
| 4,162,616 | A * | 7/1979 | Hayashida .............. | B60T 11/22 60/533 |
| 4,560,049 | A | 12/1985 | Uchibaba et al. | |
| 4,840,082 | A | 6/1989 | Terashima et al. | |
| 5,538,270 | A * | 7/1996 | Gajek .................... | B62K 23/06 188/24.12 |
| 6,227,342 | B1 * | 5/2001 | Armbruster ............. | F16D 23/12 192/85.57 |

(Continued)

FOREIGN PATENT DOCUMENTS

| | | |
|---|---|---|
| CN | 202063230 U | 12/2011 |
| DE | 20 2014 000 348 U1 | 5/2014 |

(Continued)

*Primary Examiner* — Bradley T King
*Assistant Examiner* — Mahbubur Rashid
(74) *Attorney, Agent, or Firm* — Global IP Counselors, LLP

(57) ABSTRACT

A hydraulic operating device for a small vehicle including a bicycle is basically provided with a base member, an operating member, a piston, a handlebar fixing structure and a hydraulic reservoir tank. The base member includes a cylinder having a cylinder bore. The operating member is pivotally coupled to the base member about a pivot axis. The piston is movably disposed in the cylinder bore and operatively coupled to the operating member to move the piston within the cylinder bore. The handlebar fixing structure is coupled to the base member. The handlebar fixing structure defines a handlebar arrangement area. The hydraulic reservoir tank has a hydraulic fluid chamber fluidly connected to the cylinder bore. The hydraulic reservoir tank at least partially overlaps the handlebar arrangement area as viewed in a pivot axis direction parallel to the pivot axis of the operating member.

19 Claims, 4 Drawing Sheets

(56) References Cited

U.S. PATENT DOCUMENTS

| | | | |
|---|---|---|---|
| 6,336,327 B1* | 1/2002 | Noro | B60T 7/10 60/533 |
| 6,336,525 B1 | 1/2002 | Leng | |
| 6,739,133 B2 | 5/2004 | Barnett | |
| 6,871,729 B2 | 3/2005 | Huster et al. | |
| 7,100,751 B2 | 9/2006 | Lavezzi | |
| 7,204,088 B2* | 4/2007 | Uchiyama | B62L 3/023 60/594 |
| 7,530,435 B2 | 5/2009 | Lumpkin | |
| 7,963,114 B2* | 6/2011 | Moore | B60T 11/16 188/344 |
| 8,061,234 B2* | 11/2011 | Lavezzi | B60T 11/22 74/522 |
| 8,763,487 B1* | 7/2014 | Pohl | B62L 3/023 74/488 |
| 8,776,966 B2* | 7/2014 | Hirose | B60T 7/102 188/344 |
| 8,905,205 B2* | 12/2014 | Matsushita | B62K 23/06 188/344 |
| 9,233,730 B2* | 1/2016 | Kariyama | B62M 25/04 |
| 9,815,440 B2* | 11/2017 | Colombo | B60T 7/102 |
| 2002/0070084 A1 | 6/2002 | Chou | |
| 2004/0045775 A1 | 3/2004 | Lavezzi | |
| 2005/0056508 A1 | 3/2005 | Laghi | |
| 2011/0240426 A1* | 10/2011 | Hirose | B60T 7/102 188/344 |
| 2013/0277162 A1* | 10/2013 | Nago | B62K 23/06 188/344 |
| 2014/0038757 A1* | 2/2014 | Kariyama | B60T 17/043 474/101 |
| 2014/0060986 A1 | 3/2014 | Miles | |
| 2014/0231202 A1* | 8/2014 | Shih | B62L 3/023 188/344 |
| 2015/0000452 A1* | 1/2015 | Hirotomi | B62K 23/06 74/488 |
| 2015/0367908 A1* | 12/2015 | Kariyama | B62K 23/06 188/72.4 |
| 2016/0090150 A1* | 3/2016 | Kobayashi | B62L 3/023 60/533 |
| 2016/0257372 A1* | 9/2016 | Nakai | B62L 3/023 |

FOREIGN PATENT DOCUMENTS

| | | | | |
|---|---|---|---|---|
| EP | 0100179 A1 * | 2/1984 | | B62L 3/023 |
| EP | 0 764 574 A1 | 3/1997 | | |
| EP | 1514757 B1 | 8/2008 | | |
| EP | 2338778 B1 | 1/2016 | | |
| FR | 581 837 A | 12/1924 | | |
| FR | 917 581 A | 1/1947 | | |
| WO | 02/058988 A1 | 8/2002 | | |

* cited by examiner

HYDRAULIC OPERATING DEVICE

BACKGROUND

Field of the Invention

This invention generally relates to a hydraulic operating device for a small vehicle including a bicycle. More specifically, the present invention relates to a bicycle hydraulic operating device having a hydraulic reservoir tank.

Background Information

Recently, small vehicles, in particular bicycles, have been provided with hydraulic operating systems such as a hydraulic brake system. The hydraulic operating system for a bicycle typically has a hydraulic operating (actuating) device that is fluidly connected to a hydraulic operated device by a hydraulic hose. The hydraulic operated device is hydraulically controlled by hydraulic fluid flowing through the hydraulic hose in response to an operation of the hydraulic operating device. For example, in the case of a hydraulic brake system, a brake caliper (i.e., the hydraulic operated device) is hydraulically controlled by hydraulic fluid flowing through the hydraulic hose in response to an operation of a brake lever of the hydraulic operating device. In particular, the operation of the brake lever forces hydraulic fluid through the hydraulic hose to the brake caliper. The hydraulic fluid then moves one or more pistons to cause the brake pads to squeeze a brake rotor that is attached to a hub of a bicycle wheel.

SUMMARY

Generally, the present disclosure is directed to various features of a hydraulic operating device for a small vehicle including a bicycle. Small vehicles as used here in refers to electric and non-electric vehicles regardless of the number of their wheels, but does not include four wheeled vehicles having an internal combustion engine as a power source for driving the wheels, or four wheeled electric vehicles that require a license to operate on public roads.

In one feature, a hydraulic operating device for a small vehicle including a bicycle is provided in which a hydraulic reservoir tank is positioned to provide a compact arrangement.

In view of the state of the known technology and in accordance with a first aspect of the present disclosure, a hydraulic operating device for a small vehicle including a bicycle is provided that basically comprises a base member, an operating member, a piston, a handlebar fixing structure and a hydraulic reservoir tank. The base member includes a cylinder having a cylinder bore. The operating member is pivotally coupled to the base member about a pivot axis. The piston is movably disposed in the cylinder bore and operatively coupled to the operating member to move the piston within the cylinder bore. The handlebar fixing structure is coupled to the base member. The handlebar fixing structure defines a handlebar arrangement area. The hydraulic reservoir tank has a hydraulic fluid chamber fluidly connected to the cylinder bore. The hydraulic reservoir tank at least partially overlaps the handlebar arrangement area as viewed in a pivot axis direction parallel to the pivot axis of the operating member.

With the hydraulic operating device according to the first aspect, it is possible to provide a hydraulic reservoir tank while maintaining a relatively compact profile of the hydraulic operating device with respect to the handlebar. It is thus possible to arrange the pivot axis closer to the handlebar for easy operation of the operating member.

In accordance with a second aspect of the present invention, a hydraulic operating device for a small vehicle including a bicycle is provided that basically comprises a base member, a handlebar fixing structure, a cylinder bore, an operating member and a piston. The handlebar fixing structure is coupled to the base member. The cylinder bore is provided on the base member. The operating member is pivotally coupled to the base member about a pivot axis. The piston is movably disposed in the cylinder bore and operatively coupled to the operating member to move the piston within the cylinder bore. The piston at least partly overlaps the handlebar fixing structure as viewed in a first perpendicular direction perpendicular to the pivot axis of the operating member.

With the hydraulic operating device according to the second aspect, it is possible to provide a hydraulic reservoir tank while maintaining a relatively compact profile of the hydraulic operating device with respect to the handlebar. It is thus possible to arrange the pivot axis closer to the handlebar for easy operation of the operating member.

In accordance with a third aspect of the present invention, the hydraulic operating device according to the first or second aspect is configured so that the cylinder bore defines a cylinder axis, and the hydraulic reservoir tank extends along a longitudinal axis and at least partially overlaps the cylinder bore as view in a pivot axis direction parallel to the pivot axis of the operating member. The longitudinal axis is angled with respect to the cylinder axis with a range from 5 degrees to 15 degrees as viewed in the pivot axis direction.

With the hydraulic operating device according to the third aspect, it is possible to provide a hydraulic reservoir tank while maintaining a relatively compact profile of the hydraulic operating device with respect to the handlebar. It is thus possible to arrange the pivot axis closer to the handlebar for easy operation of the operating member.

In accordance with a fourth aspect of the present invention, the hydraulic operating device according to any one of the first to third aspects is configured so that the cylinder bore has a cylinder axis that is not perpendicular to a handlebar axis of the handlebar arrangement area as viewed in the pivot axis direction.

With the hydraulic operating device according to the fourth aspect, it is possible to maintain a relatively compact profile.

In accordance with a fifth aspect of the present invention, the hydraulic operating device according to the fourth aspect is configured so that the cylinder axis is not parallel to the handlebar axis of the handlebar arrangement area as viewed in the pivot axis direction.

With the hydraulic operating device according to the fifth aspect, it is possible to provide space between the handlebar and the cylinder so that additional components can be mounted adjacent a grip portion of the handlebar.

In accordance with a sixth aspect of the present invention, the hydraulic operating device according to the fourth or fifth aspect is configured so that the hydraulic reservoir tank extends along a longitudinal axis that is not perpendicular to the handlebar axis of the handlebar arrangement area as viewed in the pivot axis direction.

With the hydraulic operating device according to the sixth aspect, it is possible to compactly arrange the hydraulic reservoir tank.

In accordance with a seventh aspect of the present invention, the hydraulic operating device according to the sixth aspect is configured so that the longitudinal axis is not parallel to the handlebar axis of the handlebar arrangement area as viewed in the pivot axis direction.

With the hydraulic operating device according to the seventh aspect, it is possible to provide space between the handlebar and the hydraulic reservoir tank so that additional components can be mounted adjacent a grip portion of the handlebar.

In accordance with an eighth aspect of the present invention, a hydraulic operating device for a small vehicle including a bicycle is provided that basically comprises a base member, a handlebar fixing structure, a cylinder bore, an operating member, a piston and a hydraulic reservoir tank. The handlebar fixing structure is coupled to the base member. The handlebar fixing structure defines a handlebar arrangement area extending along a handlebar axis. The cylinder bore is provided on the base member and has a cylinder axis being not perpendicular to the handlebar axis. The operating member is pivotally coupled to the base member about a pivot axis. The piston is movably disposed in the cylinder bore and operatively coupled to the operating member to move the piston within the cylinder bore. The hydraulic reservoir tank extends along the cylinder bore. The hydraulic reservoir tank has an end portion closest to the handlebar axis. A distance between the end portion and the handlebar axis as viewed in a pivot axis direction parallel to the pivot axis of the operating member is equal to or smaller than 12 millimeters.

With the hydraulic operating device according to the eighth aspect, it is possible to provide a hydraulic reservoir tank while maintaining a relatively compact profile of the hydraulic operating device with respect to the handlebar. It is thus possible to arrange the pivot axis closer to the handlebar for easy operation of the operating member.

In accordance with a ninth aspect of the present invention, the hydraulic operating device according to any one of the first to eighth aspects is configured so that the hydraulic reservoir tank is offset with respect to the handlebar arrangement area as view in a second perpendicular direction perpendicular to the pivot axis of the operating member.

With the hydraulic operating device according to the ninth aspect, it is possible to provide space between the handlebar and the hydraulic reservoir tank so that additional components can be mounted adjacent a grip portion of the handlebar.

In accordance with a tenth aspect of the present invention, the hydraulic operating device according to any one of the first to ninth aspects is configured so that the hydraulic reservoir tank has a lid opening defining a maximum width and a reservoir bore extending from the lid opening, the reservoir bore defining a maximum depth larger than the maximum width.

With the hydraulic operating device according to the tenth aspect, it s possible to provide a compact hydraulic reservoir tank.

In accordance with an eleventh aspect of the present invention, the hydraulic operating device according to any one of the first to tenth aspects is configured so that the reservoir bore has a cylindrical shape.

With the hydraulic operating device according to the eleventh aspect, it is possible to easily manufacture the reservoir bore.

In accordance with a twelfth aspect of the present invention, the hydraulic operating device according to any one of the first to eleventh aspects is configured so that the pivot axis of the operating member is arranged such that the operating member pushes the piston within the cylinder bore from a non-actuated position to an actuated position as the operating member is actuated about the pivot axis.

With the hydraulic operating device according to the twelfth aspect, it is possible to easily actuate the piston using the operating member.

In accordance with a thirteenth aspect of the present invention, the hydraulic operating device according to any one of the first to twelfth aspects is configured so that the operating member includes a lever.

With the hydraulic operating device according to the thirteenth aspect, it is possible to easily operate the operating member from the handlebar.

In accordance with a fourteenth aspect of the present invention, the hydraulic operating device according to any one of the first to thirteenth aspects is configured so that the cylinder defines a hydraulic pressure chamber with a space between the piston and a fluid outlet port of the cylinder, and the hydraulic reservoir tank is partially disposed on a first side of the handlebar fixing structure while the hydraulic pressure chamber is disposed on a second side of the handlebar fixing structure as view in the pivot axis direction.

With the hydraulic operating device according to the fourteenth aspect, it is possible to compactly arrange the cylinder and the hydraulic reservoir tank with respect to the handlebar fixing structure.

In accordance with a fifteenth aspect of the present invention, the hydraulic operating device according to any one of the first to fourteenth aspects further comprises a biasing element which is disposed in the cylinder bore, and biases the piston to a non-actuated position.

With the hydraulic operating device according to the fifteenth aspect, it is possible to ensure the piston returns to an initial position after being actuated.

In accordance with a sixteenth aspect of the present invention, the hydraulic operating device according to any one of the first to fifteenth aspects is configured so that the handlebar fixing structure includes a first clamp part and a second clamp part. The first clamp part is hingedly connected to the second clamp part.

With the hydraulic operating device according to the sixteenth aspect, it is possible to easily attach the hydraulic operating device to a handlebar.

In accordance with a seventeenth aspect of the present invention, the hydraulic operating device according to any one of the first to sixteenth aspects is configured so that the cylinder bore has a cylinder axis that diverges from a handlebar axis of the handlebar arrangement area in an actuation direction of the piston.

With the hydraulic operating device according to the seventeenth aspect, it is possible to provide space between the handlebar and the hydraulic reservoir tank so that additional components can be mounted adjacent a grip portion of the handlebar.

In accordance with an eighteenth aspect of the present invention, the hydraulic operating device according to any one of the first to seventeenth aspects further comprises a bleed valve fluidly connected to the hydraulic fluid chamber of the hydraulic reservoir tank.

With the hydraulic operating device according to the eighteenth aspect, it is possible to remove air from the hydraulic reservoir tank.

In accordance with a nineteenth aspect of the present invention, the hydraulic operating device according to the eighteenth aspect is configured so that the bleed valve is disposed on a first side of the handlebar fixing structure while the hydraulic reservoir tank is partly disposed on a second side of the handlebar fixing structure as view in the pivot axis direction.

With the hydraulic operating device according to the nineteenth aspect, it is possible to provide a compact hydraulic reservoir tank.

Also, other objects, features, aspects and advantages of the disclosed hydraulic operating device will become apparent to those skilled in the art from the following detailed description, which, taken in conjunction with the annexed drawings, discloses one embodiment of the hydraulic operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field, in particular the bicycle field from this disclosure that the following descriptions of the embodiments are provided for illustration only and not for the purpose of limiting the invention as defined by the appended claims and their equivalents.

Figure 1:
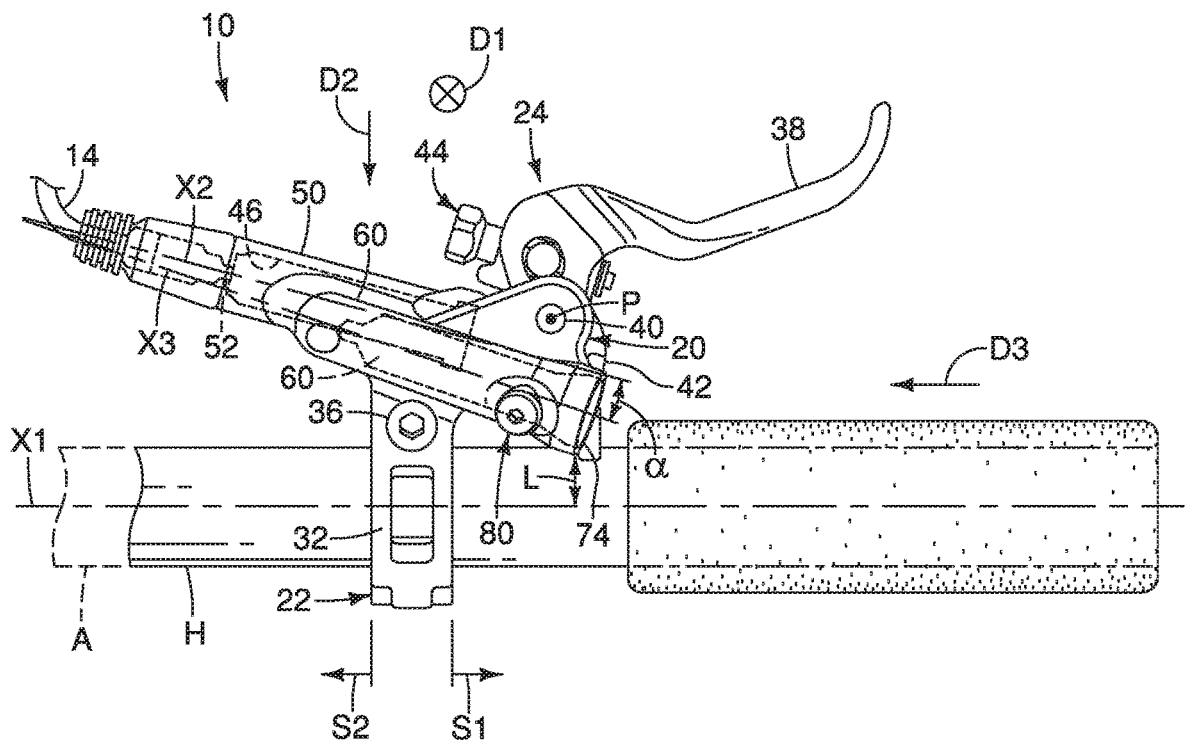
FIG. 1 is a top plan view of a portion of a handlebar equipped with a hydraulic operating device in accordance with one illustrated embodiment.
Figure 2:
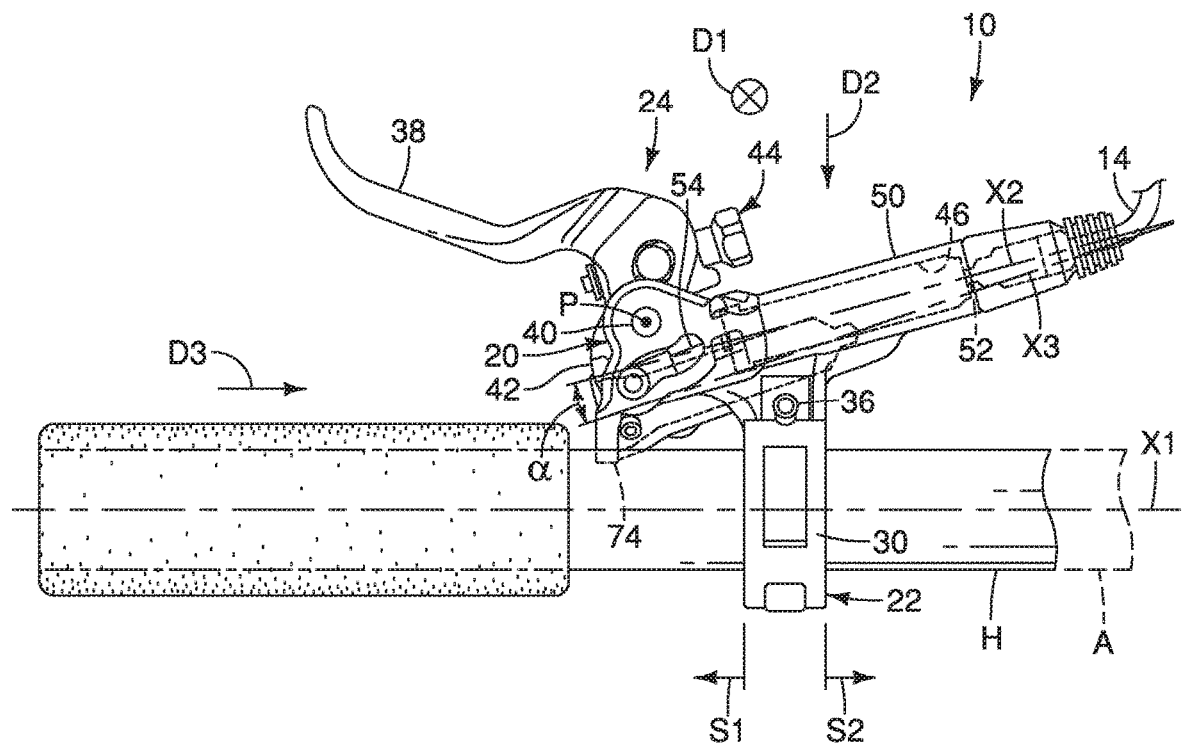
FIG. 2 is a bottom plan view of the portion of the handlebar and the hydraulic operating device illustrated in FIG. 1.

Referring initially to FIGS. 1 and 2, a hydraulic operating device 10 is illustrated that in accordance with one illustrative embodiment. Here, the hydraulic operating device 10 is a bicycle hydraulic operating device. In more detail, the hydraulic operating device 10 is a bicycle hydraulic brake operating device. The hydraulic operating device 10 is installed on a bicycle of which only a portion of a handlebar H is shown. The hydraulic operating device 10 is fluidly connected to the hydraulic operated device (not shown) by a hydraulic hose 14. As illustrated in FIGS. 1 and 2, the hydraulic operating device 10 is a right-hand side hydraulic brake actuating device that is operated by the rider's right hand to actuate the hydraulic operated device such as a disc brake caliper. It will be apparent to those skilled in the bicycle field that the configuration of hydraulic operating device 10 can be adapted to a left-hand side hydraulic brake actuating device that is operated by the rider's left hand. Also, the hydraulic operating device 10 can be used with other bicycle components other than a disc brake caliper.

The hydraulic operating device 10 comprises a base member 20, a handlebar fixing structure 22 and an operating member 24. In the illustrated embodiment, the hydraulic operating device 10 is mounted to the handlebar (bicycle handlebar) H by the handlebar fixing structure 22. The handlebar fixing structure 22 is coupled to the base member 20. The handlebar fixing structure 22 defines a handlebar arrangement area A (FIGS. 1 and 2). The handlebar arrangement area A has a length dimension corresponding to a length dimension of the handlebar H in an axial direction and a width dimension corresponding to the diameter of the handlebar H. The handlebar arrangement area A extends along a handlebar axis X1. The handlebar axis X1 extends longitudinally along the handlebar H between opposite ends of the handlebar H. Thus, the handlebar arrangement area A coincides with the handlebar H in the fixing state.

Figure 3:
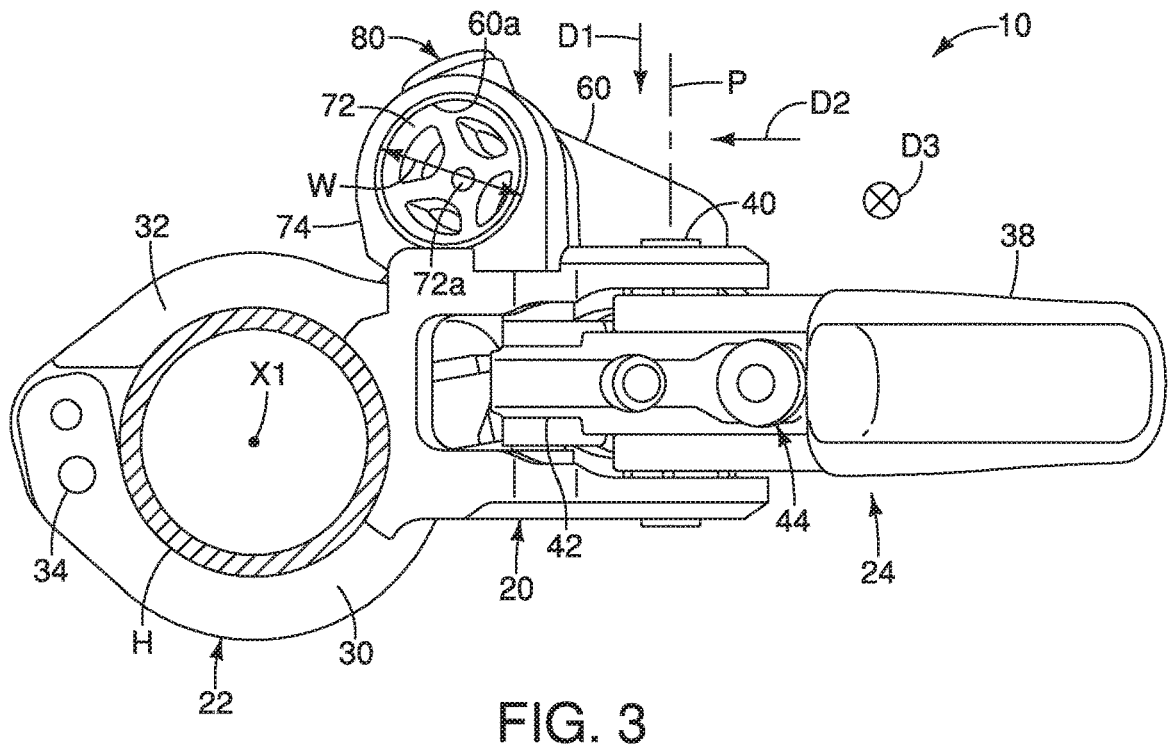
FIG. 3 is an enlarged outside end elevational view of the hydraulic operating device illustrated in FIGS. 1 and 2 in which the handlebar shown in cross section.

In the illustrated embodiment, as seen in FIG. 3, the handlebar fixing structure 22 includes a first clamp part 30 and a second clamp part 32. The first clamp part 30 is hingedly connected to the second clamp part 32. Specifically, the first clamp part 30 has a first end fixed to the base member 20 and a second end hingedly connected the second clamp part 32 by a pivot pin 34. The second clamp part 32 has a first end releasably attached to the first clamp part 30 by a fixing bolt 36 and a second end hingedly connected the first clamp part 30 by the pivot pin 34. By tightening the fixing bolt 36, the first ends of the first and second clamp parts 30 and 32 are moved together to tighten the first and second clamp parts 30 and 32 around the handlebar H.

Figure 4:
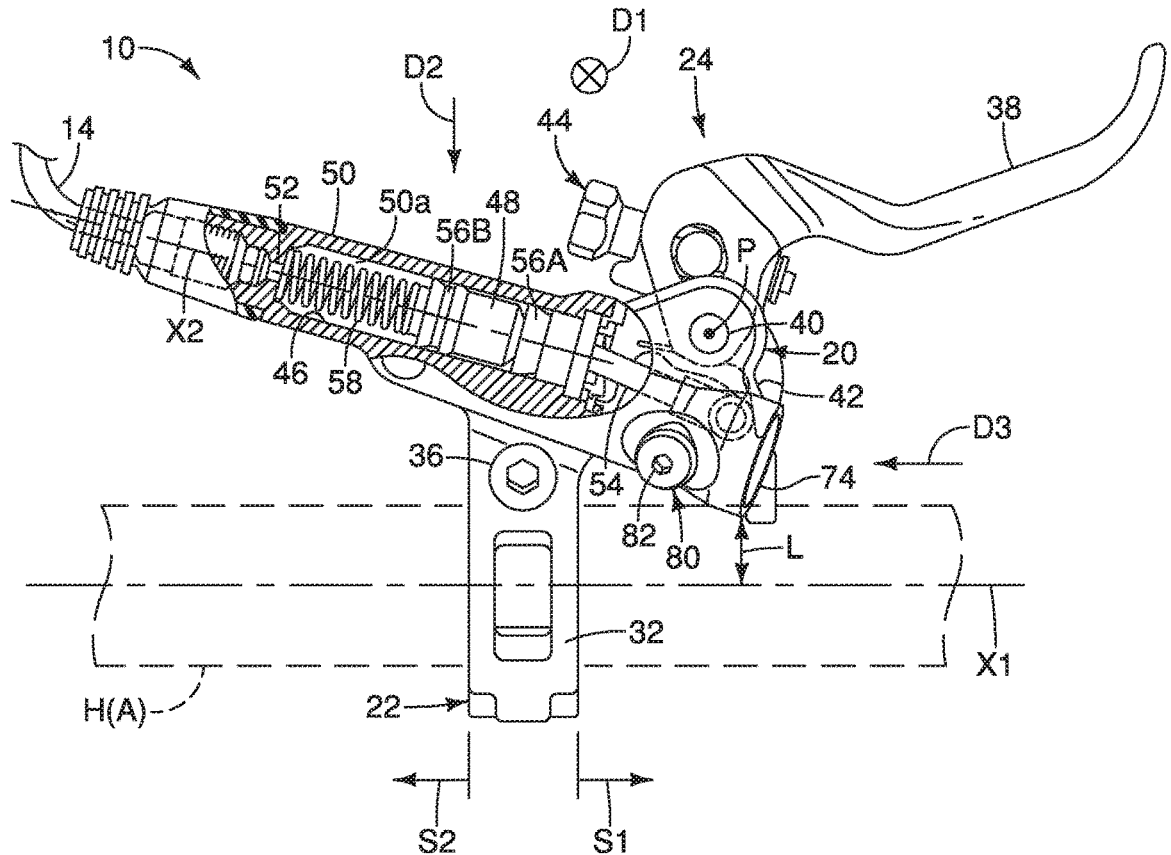
FIG. 4 is a cross-sectional view of the hydraulic operating device illustrated in FIGS. 1 to 3 as taken along section plane perpendicular to a pivot axis of the brake operating (lever) member and passing through a cylinder axis of a cylinder bore provided in the base member.
Figure 5:
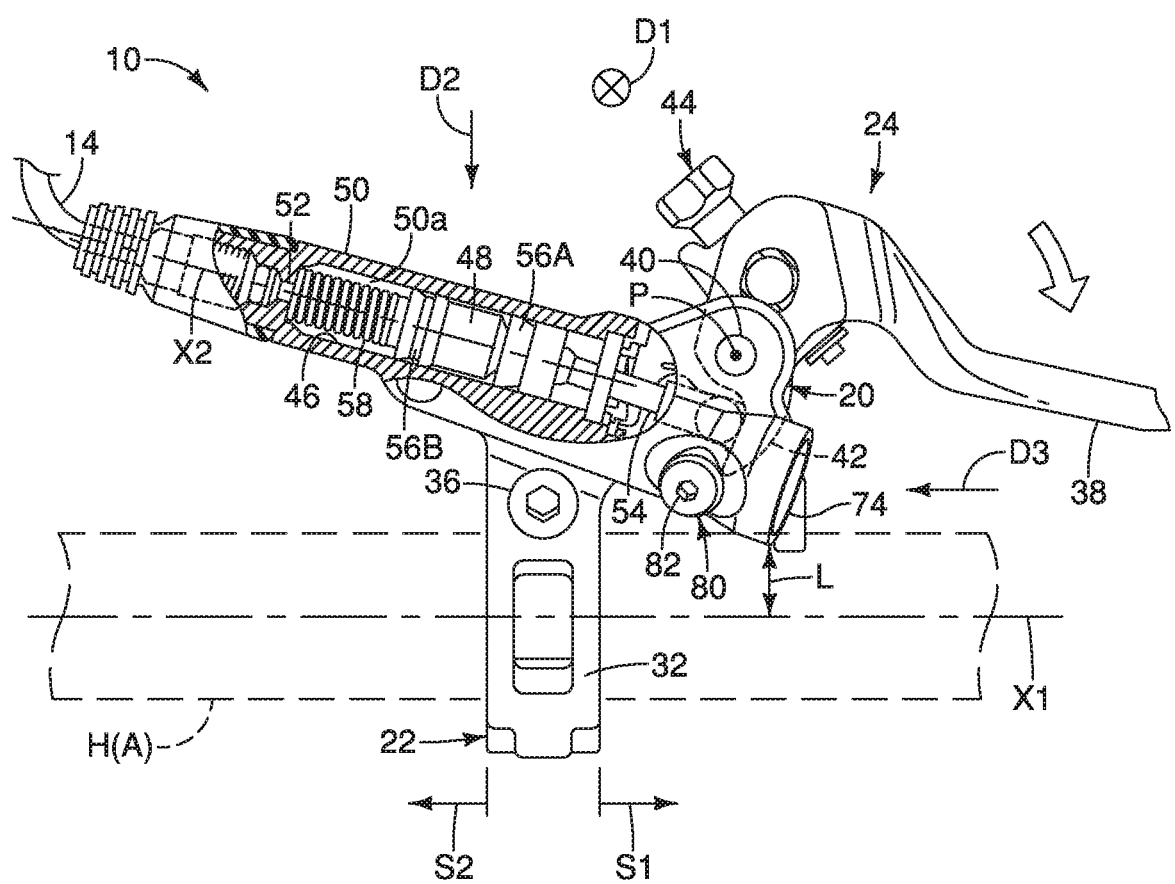
FIG. 5 is a cross-sectional view, similar to FIG. 4, of the hydraulic operating device illustrated in FIGS. 1 to 4 but in which the brake operating (lever) member has been moved to an actuated position.

As seen in FIGS. 4 and 5, in the illustrated embodiment, the operating member 24 is pivotally coupled to the base member 20 about a pivot axis P. The operating member 24 includes a lever 38. Here, the lever 38 is pivotally mounted relative to the base member 20 by a pivot pin 40 from a rest (non-operated) position (FIG. 1) to an operated position (FIG. 5). Here, the operating member 24 also includes an actuation part 42 and a reach adjustment part 44. The actuation part 42 is adjustably coupled to the lever 38 by the reach adjustment part 44, such that the lever 38 is rotated with respect to the actuation part 42. The reach adjustment part 44 is adjustable to change the relative position of the lever 38 with respect to the actuation part 42. In other words, the reach adjustment part 44 is adjustable to change a rest position or non-actuated position of the lever 38 relative to the base member 20. Since reach adjustment mechanism are known and optional, the reach adjustment part 44 will not be discussed in detail herein.

The hydraulic operating device 10 further comprises a cylinder bore 46 and a piston 48. The cylinder bore 46 is provided on the base member 20. Specifically, the base member 20 includes a cylinder 50 having the cylinder bore 46. In other words, the cylinder 50 defines the cylinder bore 46. The cylinder 50 defines a hydraulic pressure chamber 50a with a space between the piston 48 and a fluid outlet port 52 of the cylinder 50. The pivot axis P of the operating member 24 is arranged such that the operating member 24 pushes the piston 48 within the cylinder bore 46 from a non-actuated position (FIG. 4) to an actuated position (FIG. 5) as the operating member 24 is actuated about the pivot axis P.

The piston 48 is movably disposed in the cylinder bore 46 and operatively coupled to the operating member 24 to move the piston 48 within the cylinder bore 46. The cylinder bore 46 defines a cylinder axis X2. Thus, the piston 48 moves linearly along the cylinder axis X2. In other words, here, the cylinder axis X2 is the center cylinder axis that extends in the direction of movement of the piston 48 inside of the cylinder bore 46. As seen in FIGS. 1 to 4, the cylinder axis X2 is not perpendicular to the handlebar axis X1 of the handlebar arrangement area A as viewed in a pivot axis direction D1 (indicated by the symbol "⊗" in FIGS. 1, 2, 4 and 5) that is parallel to the pivot axis P of the operating member 24. Also, as seen in FIGS. 1 to 4, the cylinder axis X2 is not parallel to the handlebar axis X1 of the handlebar arrangement area A as viewed in the pivot axis direction D1. The cylinder axis X2 diverges from the handlebar axis X1 of the handlebar arrangement area A in an actuation direction of the piston 48 (i.e., a left side direction in the illustrated embodiment).

Figure 6:
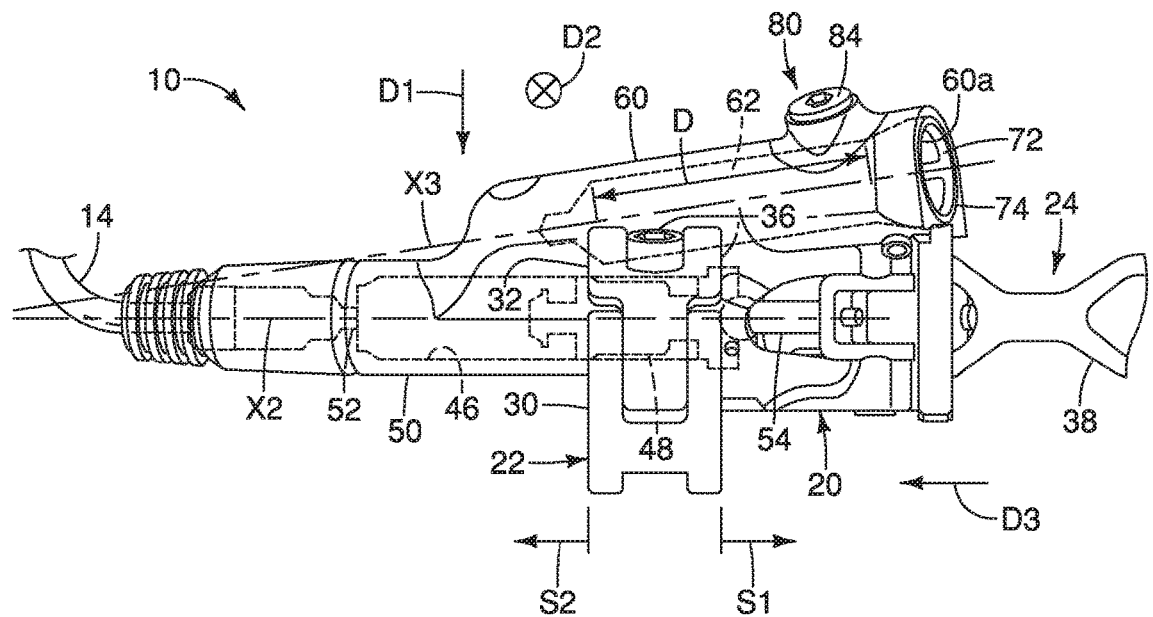
FIG. 6 is a rear side elevational view of the hydraulic operating device illustrated in FIGS. 1 to 5.

The operating member 24 further includes a push or connecting rod 54 that operatively connects the lever 38 and the actuation part 42 to the piston 48. In this way, for example, the operating member 24 is coupled to the piston 48 to move the piston 48 within the cylinder bore 46. The piston 48 preferably includes a first sealing ring 56A and a second sealing ring 56B. The first and second sealing rings 56A and 56B are in sliding contact with the cylinder bore 46. The first sealing ring 56A is spaced apart from the second sealing ring 56B along the cylinder axis X2 of the cylinder bore 46. The first and second sealing rings 56A and 56B are preferably elastomeric (e.g., rubber) O-rings that each have a uniform cross sectional profile. As seen in FIG. 6, the piston 48 at least partly overlaps the handlebar fixing structure 22 as viewed in a first perpendicular direction D2 (indicated by the symbol "⊗" in FIGS. 1, 2, 4 and 5) that is perpendicular to the pivot axis P of the operating member 24. In the illustrated embodiment the first perpendicular direction D2 is perpendicular to both the pivot axis P and the handlebar axis X1.

Figure 7:
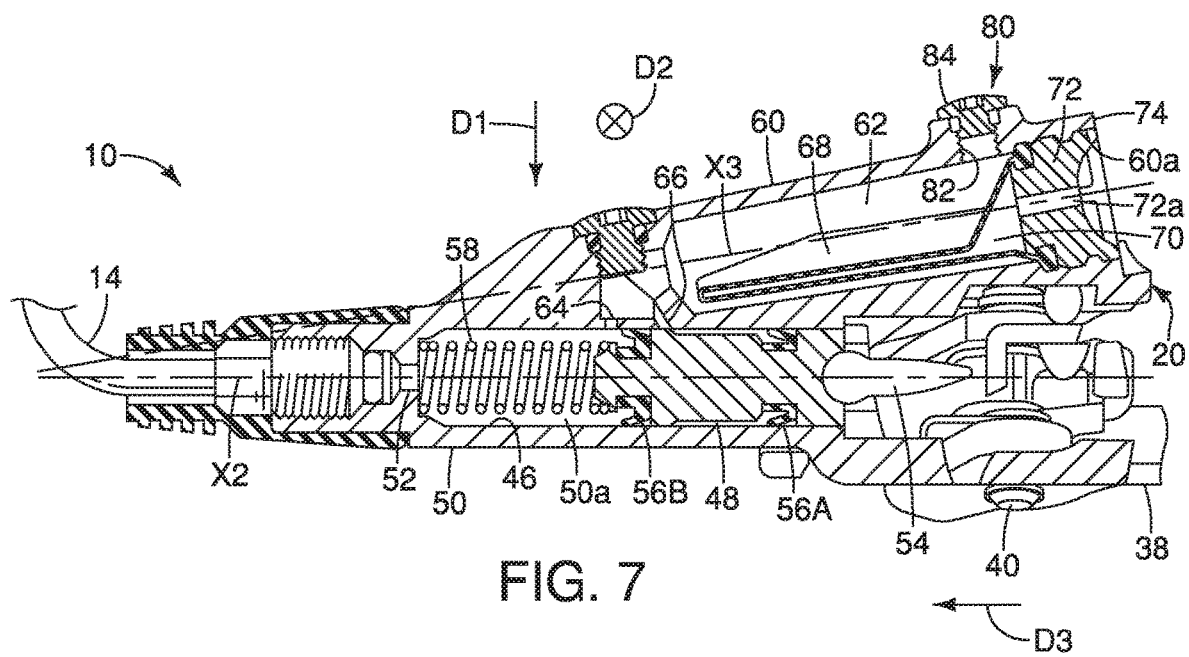
FIG. 7 is a cross-sectional view of the hydraulic operating device illustrated in FIGS. 1 to 6 as taken along section plane parallel to the pivot axis of the brake operating (lever) member and passing through the cylinder axis of the cylinder bore provided in the base member.

As seen in FIGS. 4 and 7, the hydraulic operating device 10 further comprises a biasing element 58 that is disposed in the cylinder bore 46, and biases the piston 48 to a non-actuated position. Here, the biasing element 58 is a coil compression spring that biases the piston 48 to the non-actuated (rest or non-operated) position. The biasing element 58 also biases the operating member 24 to its rest position (i.e., no external force applied to the lever 38) as seen in FIGS. 4 and 7. Thus, the piston 48 compresses the biasing element 58 as the piston 48 moves in the cylinder bore 46 in response to an operation of the lever 38 of the operating member 24.

Also, in the illustrated embodiment, the hydraulic operating device 10 further comprises a hydraulic reservoir tank 60. The hydraulic reservoir tank 60 extends along the cylinder bore 46. As seen in FIG. 3, the hydraulic reservoir tank 60 is offset with respect to the handlebar arrangement area A as view in a second perpendicular direction D3 that is perpendicular to the pivot axis P of the operating member 24. In the illustrated embodiment, the second perpendicular direction D3 is perpendicular to the pivot axis P and is parallel to the handlebar axis X1. As seen in FIGS. 4 and 5, the hydraulic reservoir tank 60 at least partially overlaps the handlebar arrangement area A as viewed in the pivot axis direction D1 that is parallel to the pivot axis P of the operating member 24.

In the illustrated embodiment, the hydraulic reservoir tank 60 extends along a longitudinal axis X3. The hydraulic reservoir tank 60 at least partially overlaps the cylinder bore 46 as view in the pivot axis direction D1 that is parallel to the pivot axis P of the operating member 24. As seen in FIG. 1, the longitudinal axis X3 is angled with respect to the cylinder axis X2 with a range from 5 degrees to 25 degrees as viewed in the pivot axis direction D1. In other words, an angle α between the cylinder axis X2 and the longitudinal axis X3 is set with a range from 5 degrees to 25 degrees as viewed in the pivot axis direction D1. Preferably, the angle an angle α is set with a range from 10 degrees to 20 degrees. In the illustrated embodiment, the angle α is 15 degrees. Moreover, as seen in FIG. 1, the longitudinal axis X3 is not perpendicular to the handlebar axis X1 of the handlebar arrangement area A as viewed in the pivot axis direction D1. Also, the longitudinal axis X3 not parallel to the handlebar axis X1 of the handlebar arrangement area A as viewed in the pivot axis direction D1.

As seen in FIG. 7, the hydraulic reservoir tank 60 has a hydraulic fluid chamber 62 that is fluidly connected to the cylinder bore 46. Here, the hydraulic fluid within the hydraulic fluid chamber 62 is supplied to the cylinder bore 46 via a first fluid port 64. The first fluid port 64 opens to the cylinder bore 46 inside of a piston stroke of the piston 48. The hydraulic fluid chamber 62 is further fluidly connected to the cylinder bore 46 by a second fluid port 66 that opens to the cylinder bore 46 between the first and second sealing rings 56A and 56B.

As seen in FIG. 7, the hydraulic reservoir tank 60 includes a diaphragm 68 that at least partially defines the hydraulic fluid chamber 62 and an air chamber 70. Here, the hydraulic reservoir tank 60 is integrally formed with the base member 20. In this way, the hydraulic fluid chamber 62 is partially defined by the base member 20. The hydraulic reservoir tank 60 has a lid opening 60a defining a maximum width W (FIG. 3) and a reservoir bore 60b extending from the lid opening 60a. The reservoir bore 60b defines a maximum depth D (FIG. 6) that is larger than the maximum width W. The reservoir bore 60b has a cylindrical shape. As used herein the term "cylindrical shape" includes a polygonal shape. Here, the traverse cross section of the reservoir bore 60b is circular. However, the traverse cross section of the reservoir bore 60b can be polygonal such as a octagon or a rectangle. The lid opening 60a is closed off by a plug 72 disposed in the lid opening 60a. The plug 72 also retains the diaphragm 68 inside the hydraulic reservoir tank 60. Preferably, the plug 72 has an air vent 72a that fluidly communicates the air chamber 70 with outside.

As seen in FIGS. 1, 2 and 4, the hydraulic reservoir tank 60 has an end portion 74 that is closest to the handlebar axis X1. A distance L between the end portion 74 and the handlebar axis X1 as viewed in the pivot axis direction D1 that is parallel to the pivot axis P of the operating member 24 is equal to or smaller than 12 millimeters. Preferably, the distance L is equal to or smaller than 9 millimeters. In the illustrated embodiment, the distance L is approximately 6 millimeters. Preferably, the distance L is equal to or lager than 0 mm. However, the distance L can be minus. In other words, the end portion 74 can be arranged beyond the handlebar axis X1 with respect to the pivot axis P. Also, as seen in FIG. 4, the hydraulic reservoir tank 60 is partially disposed on a first side S1 of the handlebar fixing structure 22 while the hydraulic pressure chamber 50a is disposed on a second side S2 of the handlebar fixing structure 22 as view in the pivot axis direction D1.

As seen in FIGS. 1 and 4, the hydraulic operating device 10 further comprises a bleed valve 80 that is fluidly connected to the hydraulic fluid chamber 62 of the hydraulic reservoir tank 60. Here, the bleed valve 80 includes a threaded opening 82 and a bleed screw 84 that is threaded into the threaded opening 82. As seen in FIG. 4, the bleed valve 80 is disposed on the first side S1 of the handlebar fixing structure 22 while the hydraulic reservoir tank 60 is partly disposed on the second side S2 of the handlebar fixing structure 22 as view in the pivot axis direction D1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle (a small vehicle) in an upright, riding position and equipped with the hydraulic operating device. Accordingly, these directional terms, as utilized to describe the hydraulic operating device should be interpreted relative to a bicycle (a small vehicle) in an upright riding position on a horizontal surface and that is equipped with the hydraulic operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic operating device for a small vehicle including a bicycle comprising:
    a base member including a cylinder having a cylinder bore;
    an operating member pivotally coupled to the base member about a pivot axis;
    a piston movably disposed in the cylinder bore and operatively coupled to the operating member to move the piston within the cylinder bore;
    a handlebar fixing structure coupled to the base member, the handlebar fixing structure defining a handlebar arrangement area, a first outermost exterior edge as viewed in a pivot axis direction parallel to the pivot axis of the operating member, and a second outermost exterior edge opposite to the first outermost exterior edge as viewed in the pivot axis direction; and
    a hydraulic reservoir tank having a hydraulic fluid chamber fluidly connected to the cylinder bore, the hydraulic reservoir tank at least partially overlapping the handlebar arrangement area as viewed in the pivot axis direction,
    the pivot axis being disposed on a first side with respect to the first outermost exterior edge, the cylinder bore being partly disposed on a second side opposite to the first side with respect to the second outermost exterior edge of the handlebar fixing structure, and the hydraulic reservoir tank being partly disposed on the first side and the second side such that a larger portion of the hydraulic reservoir tank is disposed on the first side.

2. The hydraulic operating device according to claim 1, wherein
    the cylinder bore defines a cylinder axis, and
    the hydraulic reservoir tank extends along a longitudinal axis and at least partially overlaps the cylinder bore as view in the pivot axis direction, the longitudinal axis being angled with respect to the cylinder axis with a range from 5 degrees to 25 degrees as viewed in the pivot axis direction.

3. The hydraulic operating device according to claim 1, wherein
    the cylinder bore has a cylinder axis that is not perpendicular to a handlebar axis of the handlebar arrangement area as viewed in the pivot axis direction.

4. The hydraulic operating device according to claim 3, wherein
    the cylinder axis is not parallel to the handlebar axis of the handlebar arrangement area as viewed in the pivot axis direction.

5. The hydraulic operating device according to claim 3, wherein
the hydraulic reservoir tank extends along a longitudinal axis that is not perpendicular to the handlebar axis of the handlebar arrangement area as viewed in the pivot axis direction.

6. The hydraulic operating device according to claim 5, wherein
the longitudinal axis not parallel to the handlebar axis of the handlebar arrangement area as viewed in the pivot axis direction.

7. The hydraulic operating device according to claim 1, wherein
the hydraulic reservoir tank is offset v respect to the handlebar arrangement area as view in a second perpendicular direction perpendicular to the pivot axis of the operating member.

8. The hydraulic operating device according to claim 1, wherein
the hydraulic reservoir tank has a lid opening defining a maximum width and a reservoir bore extending from the lid opening, the reservoir bore defining a maximum depth larger than the maximum width.

9. The hydraulic operating device according to claim 1, wherein
the reservoir bore has a cylindrical shape.

10. The hydraulic operating device according to claim 1, wherein
the pivot axis of the operating member is arranged such that the operating member pushes the piston within the cylinder bore from anon-actuated position to an actuated position as the operating member is actuated about the pivot axis.

11. The hydraulic operating device according to claim 1, wherein
the operating member includes a lever.

12. The hydraulic operating device according to claim 1, wherein
the cylinder defines a hydraulic pressure chamber With a space between the piston and a fluid outlet port of the cylinder, and
the hydraulic reservoir tank is partially disposed on the first side of the handlebar fixing structure while the hydraulic pressure chamber is disposed on the second side of the handlebar fixing structure as view in the pivot axis direction.

13. The hydraulic operating device according to claim 1, further comprising
a biasing element is disposed in the cylinder bore, and biases the piston to a on-actuated position.

14. The hydraulic operating device according to claim 1, wherein
the handlebar fixing structure includes a first clamp part and a second clamp part, the first clamp part is hingedly connected to the second clamp part.

15. The hydraulic operating device according to claim 1, wherein
the cylinder bore has a cylinder axis that diverges from a handlebar axis of the handlebar arrangement area in an actuation direction of the piston.

16. The hydraulic operating device according to claim 1, thriller comprising
a bleed valve fluidly connected to the hydraulic fluid chamber of the hydraulic reservoir tank.

17. The hydraulic operating device according to claim 16, wherein
the bleed valve is disposed on the first side of the handlebar fixing structure while the hydraulic reservoir tank is partly disposed on the second side of the handlebar fixing structure as view in the pivot axis direction.

18. A hydraulic operating device for a small vehicle including a bicycle comprising:
a base member;
a cylinder bore provided on the base member;
an operating member pivotally coupled to the base member about a pivot axis;
a handlebar fixing structure coupled to the base member, the handlebar fixing structure defining a first outermost exterior edge as viewed in a pivot axis direction parallel to the pivot axis of the operating member, and a second outermost exterior edge opposite to the first outermost exterior edge as viewed in the pivot axis direction; and
a piston movably disposed in the cylinder bore and operatively coupled to the operating member to move the piston within the cylinder bore, the piston at least partly overlapping the handlebar fixing structure as viewed in a first perpendicular direction perpendicular to the pivot axis of the operating member; and
a hydraulic reservoir tank having a hydraulic fluid chamber fluidly connected to the cylinder bore,
the pivot axis being disposed on a first side with respect to the first outermost exterior edge, the cylinder bore being partly disposed on a second side opposite to the first side with respect to the second outermost exterior edge of the handlebar fixing structure, and the hydraulic reservoir tank being partly disposed on the first side and the second side such that a larger portion of the hydraulic reservoir tank is disposed on the first side.

19. A hydraulic operating device for a small vehicle including a bicycle comprising:
a base member;
an operating member pivotally coupled to the base member about a pivot axis;
a handlebar fixing structure coupled to the base member, the handlebar fixing structure defining a handlebar arrangement area extending along a handlebar axis, a first outermost exterior edge as viewed in a pivot axis direction parallel to the pivot axis of the operating member, and a second outermost exterior edge opposite to die first outermost exterior edge as viewed in the pivot axis direction;
a cylinder bore provided on the base member and having a cylinder axis being not perpendicular to the handlebar axis;
a piston movably disposed in the cylinder bore and operatively coupled to the operating member to move the piston within the cylinder bore; and
a hydraulic reservoir tank extending along the cylinder bore, the hydraulic reservoir tank having an end portion closest to the handlebar axis, a distance between the end portion and the handlebar axis as viewed in the pivot axis direction is equal to or smaller than 12 millimeters,
the pivot axis being disposed on a first side with respect to the first outermost exterior edge, the cylinder bore being partly disposed on a second side opposite to the first side with respect to the second outermost exterior edge of the handlebar fixing structure, and the hydraulic reservoir tank being partly disposed on the first side and the second side such that a larger portion of the hydraulic reservoir tank is disposed on the first side.

\* \* \* \* \*